United States Patent [19]

Uotani et al.

[11] 4,007,068
[45] Feb. 8, 1977

[54] METHOD FOR PRESS-BONDING MOLDING OF BREAKER LAYERS FOR RADIAL TIRES

[75] Inventors: Hiroshi Uotani, Higashimurayama; Masayoshi Kubo; Nobuhiko Irie, both of Nagasaki, all of Japan

[73] Assignee: Mitsubishi Jukogyo Kabushiki Kaisha, Tokyo, Japan

[22] Filed: June 5, 1975

[21] Appl. No.: 584,198

[30] Foreign Application Priority Data

June 13, 1974 Japan .............................. 49-66506

[52] U.S. Cl. ................................. 156/123; 156/126
[51] Int. Cl.² .......................................... B29H 17/18
[58] Field of Search .......... 156/123, 124, 126, 127, 156/128 R, 128 I, 129, 130, 133, 394 R, 414, 417, 421

[56] References Cited

UNITED STATES PATENTS

| | | | |
|---|---|---|---|
| 1,785,659 | 12/1930 | State | 156/126 |
| 3,063,491 | 11/1962 | Mitchell | 156/128 R |
| 3,151,013 | 9/1964 | Nebout | 156/126 |
| 3,677,852 | 7/1972 | Fleuret et al. | 156/127 |
| 3,713,929 | 1/1973 | Bottasso et al. | 156/127 |
| 3,865,670 | 2/1975 | Habert | 156/126 |

FOREIGN PATENTS OR APPLICATIONS 235,900   8/1960   Australia ........................... 156/128

*Primary Examiner*—Charles E. Van Horn
*Assistant Examiner*—John E. Kittle
*Attorney, Agent, or Firm*—Cushman, Darby & Cushman

[57] ABSTRACT

A method for press-bonding molding of breaker layers for radial tires by pressing the breaker plys on a molding drum to form a cylindrical breaker layer. The method is characterized in that at least during the press-bonding of the breaker plys, the press-bonding face which makes no parallel relative movement with respect to the face of the breaker ply to be press-bonded.

1 Claim, 3 Drawing Figures

METHOD FOR PRESS-BONDING MOLDING OF BREAKER LAYERS FOR RADIAL TIRES

DETAILED DESCRIPTION OF THE INVENTION

This invention relates to an improvement in the method for molding of radial tyres.

A radial tyre is known as a tyre having practical values concerning the safety, the economical efficiency and the durability. This radial tyre comprises two sets of ring-like steel reinforcers called beads, which are attached to a rim for mounting of a tyre, a carcass layer for connecting beads to one another, which includes reinforcing cords disposed radially or substantially radially when seen from the side face of the tyre, a cylindrical reinforcing band called a breaker layer, which is disposed on the peripheral face of the carcass layer, and a coating of an elastomer or the like covering the outer face of the breaker layer.

In the conventional method for production of such radial tyres, at the first step, a cylindrical carcass layer is formed by bonding a carcass ply (a cord-incorporated rubbery material for a carcass layer), beads and other tyre materials to a first-stage tyre-molding drum.

At the subsequent second step, the so formed carcass layer is transferred onto a second-stage tyre-molding drum, and on this tyre-molding drum the carcass layer is formed into a curved surface body having a prescribed diameter while gradually reducing the distance between the two beads.

At the third step, a cord-incorporated rubbery material called a breaker ply is integrated with the outer peripheral face of the so expanded carcass layer. As the method for performing this integration, there can be mentioned a method in which a plurality of breaker plys are directly wound and bonded onto the outer periphery of the carcass layer to form a cylindrical breaker layer, and a method in which in order to improve the molding efficiency, a plurality of breaker plys are bonded to one another on another molding drum to form a cylindrical breaker layer in advance and the so formed breaker layer is press-bonded to the outer periphery of the carcass layer. In each of these two methods, bonding of breaker plys is accomplished by pressing a pair of rotatable round rollers to the outer face of the breaker layer and moving them from the center of the breaker layer toward both the sides while rotating the molding drum or by pressing a rotatable roller of a broad width to the outer face of the breaker layer.

At the subsequent fourth step, a ground-contacting elastomer and other tyre materials are bonded to the so formed breaker layer, whereby a raw rubber tyre (green tyre) having a form resembling that of a product tyre is formed, and this green tyre is taken out from the molding drum.

At the final fifth step, the green tyre is heated and molded into a form of a product tyre in another molding apparatus to cause chemical changes in the tyre-constituting materials. Then, necessary finishing treatments are conducted to obtain a product tyre.

In product tyres, it is generally indispensable that not only the configuration or dimension but also the distribution of the force acting on internal cords should be symmetric with respect to the central section and be uniform in the circumferential direction. If this balance is lost, vibrations are caused during running or the driving condition is worsened and the driving becomes dangerous. As contrasted with the case of a bias tyre, in the radial tyre the breaker layer is an important member assuring the strength. Accordingly, it is very important that at the third and subsequent steps, occurrence of such undesired phenomena as displacement of the breaker layer and deviation of the cord angle, which are caused when cords in the breaker layer do not reach beads, should be prevented.

Breaker plys constituting the breaker layer comprise textile cords (twisted yarns of rayon fibers, synthetic fibers or other fibers) or steel cords (twisted yarns of steel fibers) arranged in parallel to one another in one layer, and both the surfaces of the layer of the thus arranged cords are coated with a raw rubber. Cords are connected to one another only by the raw rubber, and the surface of the breaker ply is generally convex at the part where the cord is present and concave at the part intermediate between the two adjacent cords. At least one of the breaker plys constituting the breaker layer has a cord angle of about 15° with respect to the lengthwise direction of the breaker ply, and cord angles of other breaker plys are determined so that the force in the peripheral direction is well-balanced with the force in the widthwise direction in the breaker layer, though these cord angles vary to some extent depending on the number of the plys or the like.

In the conventional method in which a breaker layer is formed by bonding breaker plys by using a pair of press rollers, breaker plys are elongated when the breaker plys are strongly press-bonded by the press rollers, and especially in the case of breaker plys of a small cord angle, they are much elongated in the widthwise direction and breaker plys of a large cord angle are much elongated in the peripheral direction, whereby partial slacks are generated and wrinkles are locally formed and there is brought about a disadvantage that cord angles of the breaker plys are locally changed. This disadvantage is also brought about even when press rollers of a large width are employed, because elongation of breaker plys in the peripheral direction is not controlled. It is considered that this disadvantage will probably be overcome by imparting to breaker plys in advance a tension compensating for an expected elongation at the bonding step and winding them under such tension. However, it is practically impossible to maintain the uniform tension in all of the winding-initiating portion, the intermediate portion and the winding-terminating portion, but these procedures rather cause local changes of cord angles in the breaker plys. Therefore, such method is not actually adopted. Furthermore, if the pressing force is reduced at the step of press-bonding breaker plys so as to overcome the above disadvantage caused by elongation of breaker plys, no sufficient bonding is attained among the breaker plys and at the third and subsequent steps there is brought about another disadvantage that slips are generated among the breaker plys or air is left among them.

As a product tyre having improved properties, there has been proposed a special radial tyre formed by employing one breaker ply of a large width in which both the end portions are folded back or cord angles are changed along the widthwise direction. However, according to conventional molding methods, it is substantially impossible to fabricate such breaker ply accurately.

As pointed out hereinabove, a breaker layer is a most important reinforcing member in a radial tyre, and in order to obtain a high quality tyre it is very important to fabricate this breaker layer accurately in the molding process. In conventional molding methods, however, occurrence of such undesired phenomena as changes or disarrays of cord angles of breaker plys in the breaker layers and mutual displacement of breaker plys cannot be avoided at the breaker-forming step or subsequent step and there is inevitably brought about a defect that the ratio of defective products is high.

It is therefore a primary object of this invention to provide an improved method for molding of radial tyres which can overcome the foregoing defects involved in the conventional molding methods by improving the third step of forming a breaker layer and press-bonding the formed breaker layer to a carcass layer, which step causes the foregoing defects in the conventional methods.

More specifically, in accordance with this invention, there is provided a method for press-bonding molding of breaker layers for radial tyres comprising pressing breaker plys on a molding drum to form a cylindrical breaker layer, said method being characterized in that at least during the press-bonding of breaker plys, the press-bonding is performed by a press-bonding face which makes no parallel relative movement with respect to the face to be press-bonded of the breaker ply.

According to this invention, all the defects and disadvantages caused at the step of press-bonding molding of breaker layers in the conventional methods for the manufacture of radial tyres can be overcome completely, and product radial tyres of good quality can be effectively produced. Therefore, this invention makes great practical contributions to the art.

This invention will now be illustrated in detail by reference to an embodiment of the apparatus for practising the method of this invention, which is shown in the accompanying drawings, in which.

Figure 1:
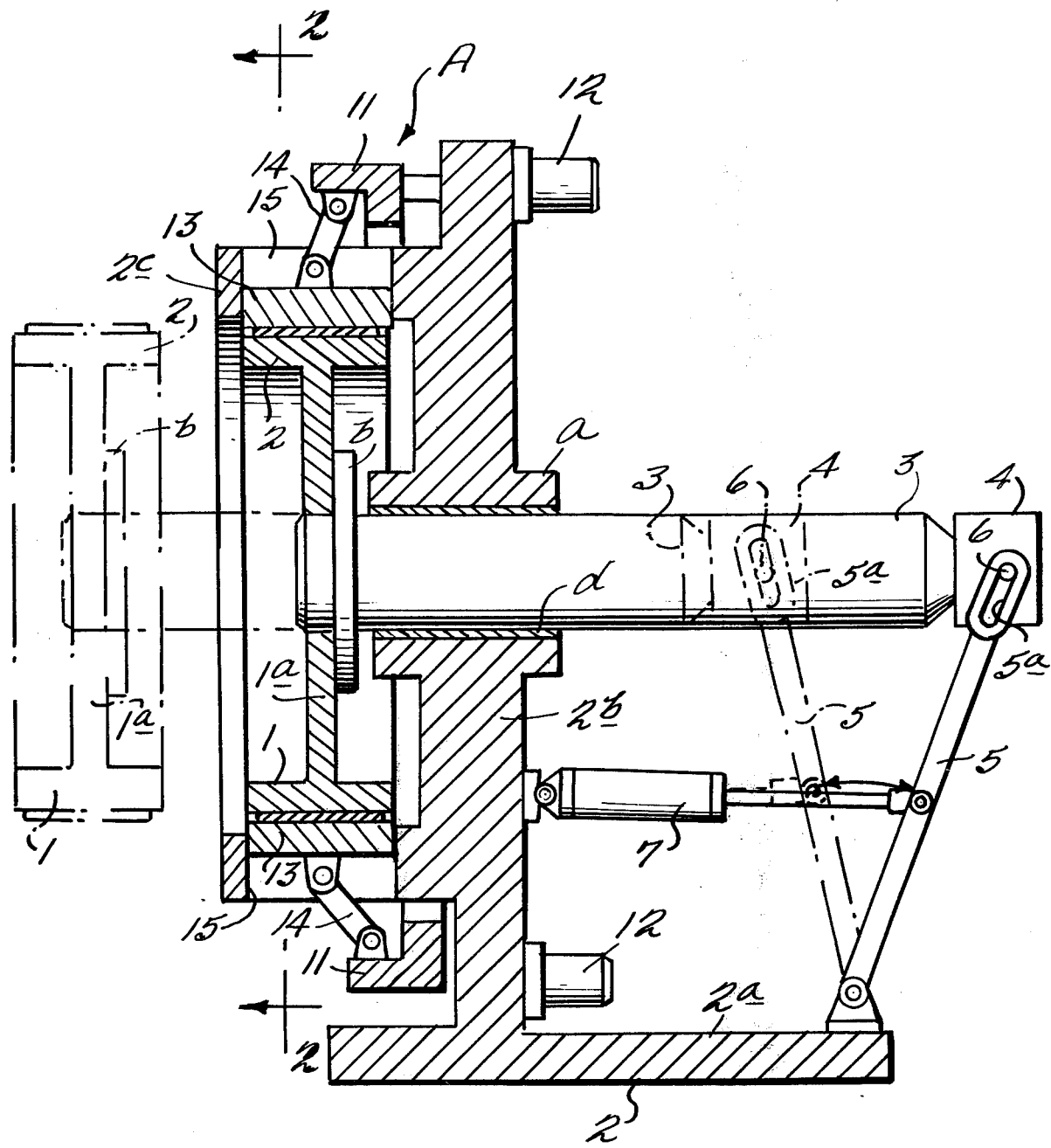
FIG. 1 is a diagram showing in solid lines the state where a press-bonding device performs press-bonding molding of a tyre material to be press-bonded which is wound on a molding drum, and in phantom lines, the winding state of the tyre material on the molding drum and also illustrating the movement of the molding drum after completion of the press-bonding molding operation.
Figure 2:
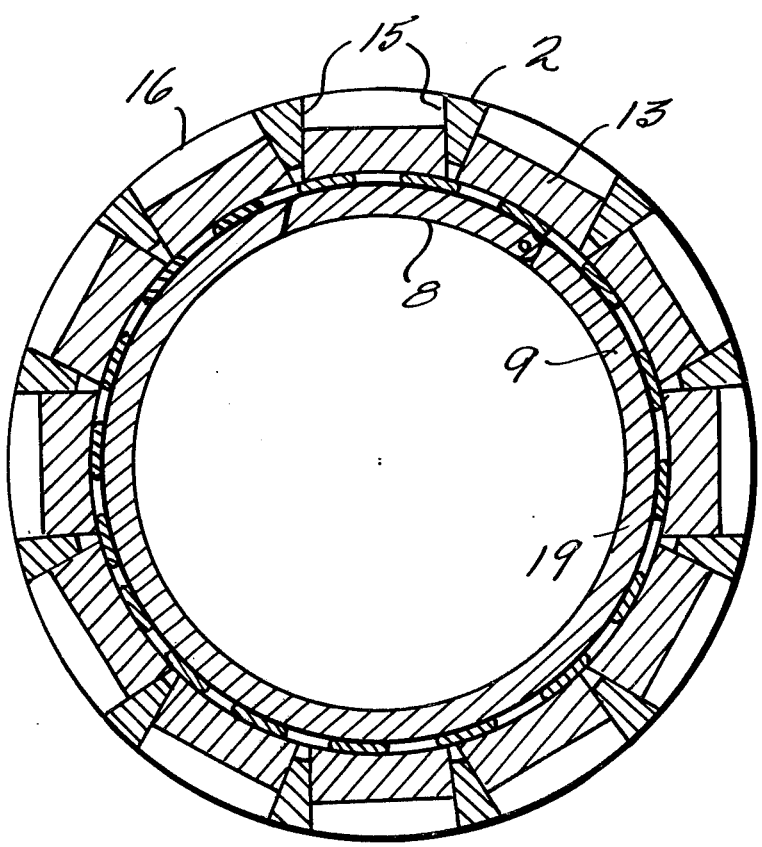
FIG. 2 is a diagram showing the longitudinal section taken along the line II—II in FIG. 1.
Figure 3:
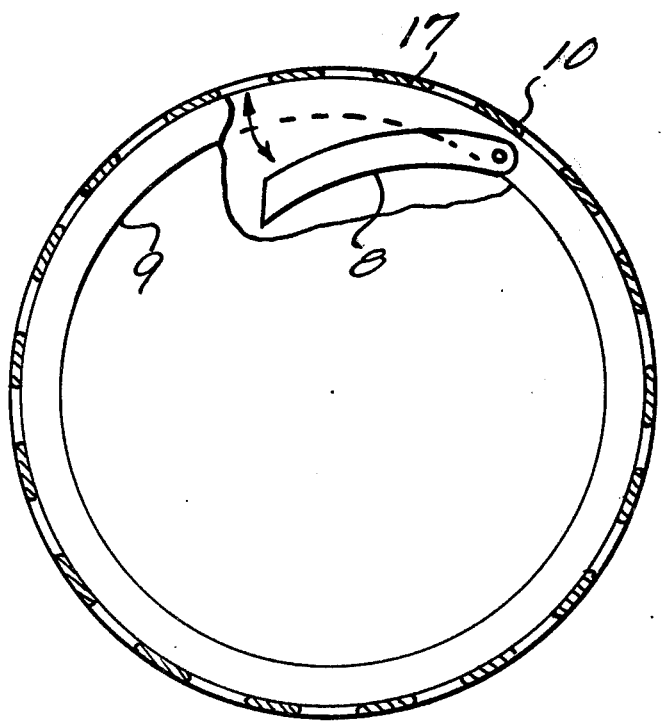
FIG. 3 is a view illustrating the cross-section of the molding drum.

In FIG. 1, referential numeral 2 denotes a fixing stand comprising a base plate 2a and a disc-like vertical frame 2b erected on the base plate 2a. A boss portion a having a lateral hole d is mounted at the center of the disc-like vertical frame 2b of the stand 2. A shaft 3 is mounted so that it can slide in the axial direction between the vertical frame 2b of the stand 2 and the lateral hole d and it can rotate. A release bearing 4 is rotatably mounted on one end of the shaft 3. A pin 6 is projected on one side of the release bearing 4, and one end of an arm 5 is swingably pin-connected to an appropriate part of the base plate 2a of the stand 2 and a long hole 5a is formed on the other end of the arm 5. The pin 6 is inserted in this long hole 5a. Referential numeral 7 denotes a fluid pressure cylinder, the base of which is pin-connected to an appropriate part of the vertical frame 2b of the stand 2 and the top end of the rod of which is pin-connected to an intermediate portion of the arm 5. By the elongation and contraction movement of this fluid pressure cylinder 7, the arm 5 is allowed to make a swinging movement with the pin-connecting point to the base plate 2 as the center of the swinging movement, and with this swinging movement of the arm 5, the shaft 3 is slided and displaced in the state supported and guided by the lateral hole d of the boss portion a of the vertical frame 2b of the stand 2 through the release bearing 4 connected to the top end of the arm 5 by the long hole 5a formed at the top end of the arm 5 and the pin 6 inserted in the long hole 5a. The shaft 3 is so arranged that it is rotated at an optional position in the thus slided and displaced state by means of a suitable drive source (not shown). A flange b is disposed on the other end of the shaft 3 so that a certain distance is kept from the left end face of the boss portion a of the vertical frame 2b even when the fluid pressure cylinder 7 is most elongated, namely when the shaft 3 makes a greatest sliding displacement toward the right in the drawings. Referential numeral 1 denotes a molding drum, the central part of a boss portion 1a of which is fixed to the flange b of the shaft 3. The center of the boss portion 1a is in agreement with the axial center of the shaft 3. As shown in FIG. 3, the drum 1 comprises a cylinder 9 having a notched portion and an arc-like body 8 mounted swingably on the notched portion of the cylinder 9 by means of a pin 10. These members are so arranged that by swinging the arc-like body 8 with the pin 10 as the center by suitable drive means (not shown) as illustrated in FIG. 3, the drum 1 is made to have a notched form or by swinging the arc-like body and fixing it at the swung position as illustrated in FIG. 2, the drum 1 is allowed to have a complete cylindrical form. In the embodiment illustrated in the drawings, one arc-like body 8 is disposed, but it is possible to mount a plurality of arc-like bodies 8. Referential numeral 11 denotes a ring-like member which can be moved by a prescribed distance in either the left or right direction by a plurality of fluid cylinders 12 fixed to the peripheral edge portion of the disc-like vertical frame 2b of the stand 2, and the center of the ring-like member 11 is in agreement with the axial center of the shaft 3. A plurality of segments 13 are slidably inserted into guide holes 15 equidistantly disposed along the circumferential direction of a guide ring 2c which is projected on the left side of the disc-like vertical frame 2b of the stand 2 so that the peripheral face of the guide ring 2c is positioned on a more inner side by a certain distance than the inner circumferential face of the ring-like member 11. One end of a link 14 is pin-connected to the outer side of the segment 13 and the other end of the link 14 is pin-connected to the inner side of the ring-like member 11. Each segment 13 is disposed so that it can move in the radial direction along the guide hole 15 synchronously with the horizontal movement of the ring-like member 11 caused by the elongation and contraction of the fluid pressure cylinder 12. The width of each segment 13 is substantially equal to the width of the molding drum 1, and when the drum 1 is in the position where the fluid pressure cylinder 7 is in the most elongated state, these segments 13 encircle the periphery of the molding drum 1. The foregoing ring-like member 11, fluid pressure cylinders 12, segments 13, links 14 and guide holes 15 constitute a press-bonding device A, and the inner circumferential faces of the segments 13 form a press-bonding face.

An embodiment of the practice of the method of this invention by using the apparatus having the above-mentioned structure will now be illustrated in the order of the steps.

1. Step of charging a material to be press-bonded (breaker ply):

The fluid pressure cylinder 7 is contracted to move the shaft 3 to the left and to keep the molding drum 1 in the state shown in FIG. 1 (at this point, the arc-like body 8 of the molding drum 1 is kept in the state shown in FIG. 2). Then, a breaker ply 17 is wound on the drum 1. At this point, the breaker ply 17 is wound while rotating the molding drum 1, or the winding may be performed automatically by using a known auxiliary device (not shown).

2. Step of preparation for press-bonding of a material to be press-bonded (breaker ply):

The fluid pressure cylinder 12 is contracted to move each segment 13 outwardly in the radial direction so that the diameter of a circle formed by the inner circumferential faces of these segments 13 is made larger than the outer diameter of the breaker ply 17. Thereafter, the fluid pressure cylinder 7 is elongated to move the shaft 3 to the right and shift the molding drum 1 to the position shown in FIG. 1.

3. Step of press-bonding of a breaker ply:

The fluid pressure cylinder 12 is elongated to move simultaneously the segments 13 inwardly in the radial direction, so that the breaker ply 17 is pressed to the peripheral face of the molding drum 1 by the inner circumferential faces of the segments 13. In this case, the press-bonding face formed by the inner circumferential faces of the segments 13 makes no relative movement in the parallel direction with respect to the face to be press-bonded of the breaker ply and the breaker ply 17 is uniformly press-bonded by this press-bonding face. Accordingly, the cord angle of the breaker ply 17 is not changed or disturbed.

4. Movement of the molding drum and repetition of the above steps:

The fluid pressure cylinder 12 is contracted to move the segments 13 outwardly in the radial direction and separate the inner circumferential faces of the segments 13 from the press-bonded surface of the breaker ply 17. Then, the fluid pressure cylinder 7 is contracted to move the shaft 3 to the left, and then, the molding drum 1 is shifted to the phantom line position shown in FIG. 1 and another breaker ply is wound on the molding drum 1, following which the above steps (1) to (3) are conducted. Also in this case, the breaker ply is tightly bonded to the previously press-bonded breaker ply by the press-bonding face formed by the segments 13 without change or disturbance of the cord angle or slips between the two breaker plys. A desired number of breaker plys are press-bonded by repeating the foregoing steps to form a breaker layer.

5. Step of withdrawal of a breaker layer:

The arc-like body 8 of the molding drum 1 is swung in the central direction of the molding drum 1 as shown in FIG. 3 to form a notch in the molding drum 1. The breaker layer can easily be removed from the drum 1 because of the presence of this notch portion.

The press-bonding molding of a breaker layer for a radial tyre is performed by the above-mentioned procedures. According to this invention, on press-bonding a breaker ply on the molding drum, the segments 13 forming a press-bonding face make no parallel relative movement with respect to the surface of the breaker ply but they are simultaneously displaced in the direction rectangular to the surface of the breaker ply to thereby press-bond the breaker plys toward the molding drum with the press-bonding face formed by the inner circumferential faces of the segments 13. Accordingly, the breaker plys can be tightly bonded at a high efficiently without change or disturbance of the cord angle or formation of slips among the breaker plys.

In the foregoing embodiment, the tyre material to be press-bonded is press-bonded and molded on the molding drum 1 by pressing the material from the outside with the inner circumferential faces of the segments 13 of the press-bonding device A. However, if in view of the combination of cord angles of breaker plys constituting the breaker layer, the kind of the cord-constituting material and other factors it is desired to press-bond the breaker plys from the inside, the arrangement relation between the molding drum 1 and the segments 13 in the above embodiment may be inversed.

What is claimed is:

1. A method for molding a radial tire breaker layer, comprising:
    a. winding a first breaker ply upon the cylindrical, radially outer peripheral surface of a molding drum;
    b. radially surrounding the first breaker ply with a radially expansible-contractile, pressure-applying member and uniformly radially contracting this member about the circumference thereof, thereby pressing the first breaker ply against said peripheral surface of the molding drum;
    c. radially expanding the pressure-applying member away from the first breaker ply and removing this member from radially surrounding the first breaker ply;
    d. winding a second breaker ply upon the first breaker ply;
    e. radially surrounding the second breaker ply with a radially expansible-contractile, pressure-applying member and uniformly radially contracting this member about the circumference thereof, thereby pressing the second breaker ply against said first breaker ply, and the first breaker ply against said peripheral surface of the molding drum to unite the first and second plies into a two ply breaker layer;
    f. radially expanding the pressure-applying member away from the second breaker ply and removing this member from radially surrounding the two ply breaker layer;
    g. for instances where a breaker layer of more than two plies is wanted, repeating steps (d), (e) and (f), thereby adding and uniting successive plies to the breaker layer to provide a multiple-ply breaker layer; and
    h. generally radially contracting the molding drum to facilitate removal of the breaker layer; and
    i. withdrawing the breaker layer from the contracted molding drum as an independent, unitary structure.

* * * * *